United States Patent [19]

Holen et al.

[11] Patent Number: 4,814,282
[45] Date of Patent: Mar. 21, 1989

[54] CENTRIFUGE FOR TWO-DIMENSIONAL CENTRIFUGATION

[75] Inventors: James T. Holen, Mundelein, Ill.; Charles R. Burke, Carlisle, Mass.

[73] Assignee: Abbott Laboratories, North Chicago, Ill.

[21] Appl. No.: 91,319

[22] Filed: Aug. 31, 1987

Related U.S. Application Data

[63] Continuation of Ser. No. 856,078, Apr. 25, 1986, abandoned, which is a continuation of Ser. No. 606,786, May 3, 1984, abandoned.

[51] Int. Cl.[4] ............................................. G01N 33/48
[52] U.S. Cl. ..................................... 436/165; 436/177; 436/180; 422/61; 422/72; 422/102; 356/427; 250/576
[58] Field of Search ........................... 422/61, 72, 102; 436/165, 177, 180; 356/426, 427; 250/576

[56] References Cited

U.S. PATENT DOCUMENTS

| 3,211,368 | 10/1965 | Shanleg | 494/10 |
| 3,848,796 | 11/1974 | Bull . | |
| 4,463,097 | 7/1984 | Guigan | 422/72 |
| 4,469,793 | 9/1984 | Guigan | 422/72 |

FOREIGN PATENT DOCUMENTS 019038 11/1980 European Pat. Off. .
8206036 10/1983 France .

Primary Examiner—Benoit Castel
Assistant Examiner—Richard D. Jordan
Attorney, Agent, or Firm—Thomas D. Brainard; Martin L. Katz

[57] ABSTRACT

Method and apparatus for generating centrifugal forces, including a plate rotatable about an axis, and at least one holding means mounted on the plate for rotation therewith, the holding means being adapted to receive an article to be subjected to centrifugal force and being rotatable relative to the plate member to permit the direction of centrifugal force acting on the article to be changed.

12 Claims, 3 Drawing Sheets

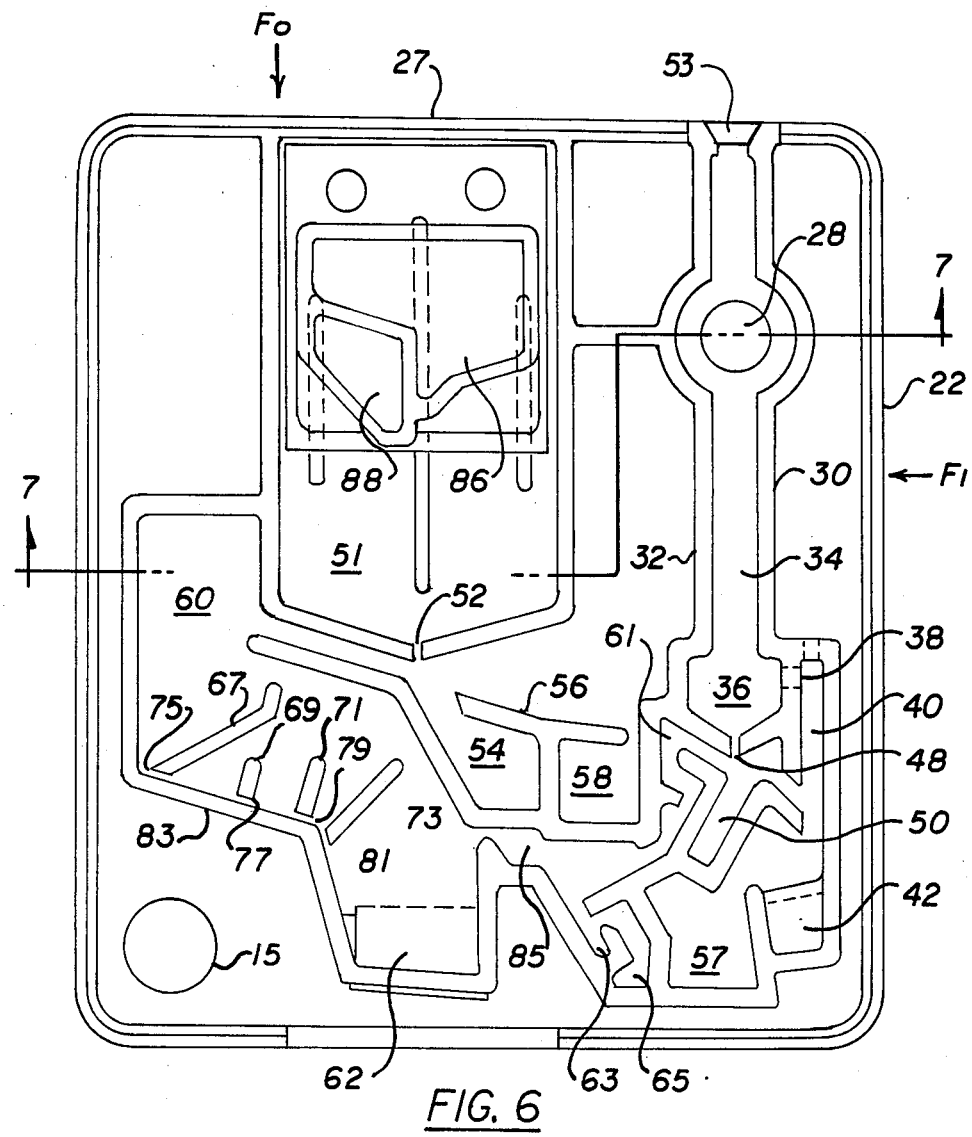
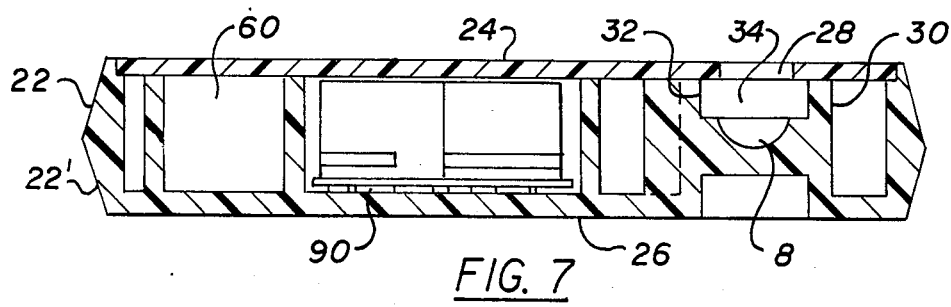

4,814,282

CENTRIFUGE FOR TWO-DIMENSIONAL CENTRIFUGATION

This is a continuation of Ser. No. 856,078, filed Apr. 25, 1986 and now abandoned, which is a continuation of Ser. No. 606,786, filed May 3, 1984, now abandoned.

BACKGROUND

This invention relates to a method and apparatus for chemical testing, and more specifically to a method and apparatus for such testing in which samples and/or reagents are manipulated by centrifugal force.

Chemical testing is used in a variety of applications, notably including testing to determine blood chemistries, immunological testing for analyzing fluids and particularly body fluids as well as a host of other liquid analytical chemical techniques, including those done in pollution monitoring activities.

Considering, for example, chemical testing to measure blood chemistries, there are presently in use many chemical techniques to measure, for example, the presence of drugs in the blood stream. In such testing, a sample of blood is isolated from a patient and spun down to separate solid constituents such as red blood cells from the liquid component of the blood. Then the fluid sample remaining is precisely measured, mixed with a measured quantity of reagent and the results of the chemical reaction determined, usually by optical means.

While such testing techniques generally provide accurate results, their performance involves quite a number of tedious and time consuming manual steps, or the use of complex instrumentation in which samples and reagents are contacted with each other and the results measured.

As will be appreciated by those skilled in the art, the techniques described above include the manual isolation of the blood sample, placing it into a centrifuge to effect the solid-liquid separation and then removal of the liquid phase, transferring it from the centrifuge to a sample container which is then placed in an analytical instrument and mixed with the reagents. Some of the more advanced instruments on the market today have the capability of automatically measuring reagents and samples, but nonetheless the manipulative steps involved in the transfer of sample and reagent must still be carried out. The automation of those steps involves the use of complex analytical equipment.

It has been proposed to employ centrifugal force in clinical chemical testing as described in U.S. Pat. Nos. 3,586,484, 3,713,775, 3,744,974, 3,864,089, 3,901,658, 4,237,234 and 4,279,862. The techniques as described in the foregoing patents do not provide any means to change the direction in which the centrifugal force acts, and hence are incapable of utilizing centrifugal force to effect all of the liquid transport functions to completely carry out, from start to finish, the chemical testing operation.

It is accordingly an object of the present invention to provide a method and apparatus which avoids the need to employ tedious manual steps and also avoids the need for complex instrumentation to carry out automated chemical testing.

It is a more specific object of the invention to provide a method and apparatus for carrying out low volume chemical testing which is simple and foolproof in its operation, and involves the use of low-cost instrumentation and equipment.

It is yet another object of the invention to provide a method and apparatus for carrying out chemical testing utilizing centrifugal force to effect liquid transport operations in which the direction of the centrifugal force acting on the fluids can be changed at will.

BRIEF DESCRIPTION OF THE DRAWINGS

These and other objects and advantages of the invention will appear more fully hereinafter, and, for purposes of illustration, but not of limitation, embodiments of the present invention are shown in the accompanying drawings wherein:

FIG. 6 is a plan view illustrating a sample processor card employed in the practice of this invention; and FIG. 7 is a sectional view taken along the lines 7—7 in FIG. 6.

SUMMARY OF THE INVENTION

The concepts of the present invention reside in a method and apparatus for carrying out chemical testing which include a plate member adapted to rotate at high speeds about an axis on which there is mounted at least one sample processor card holding member for rotation therewith. The sample card holder is dimensioned to receive a sample processor card defining a series of channels through which liquids undergoing testing can be moved under the influence of centrifugal force. The holder is thus capable of rotation relative to the plate member so that the direction of the centrifugal force exerted on the sample processor card can be changed to control the flow of liquids therethrough and thus effect transfer of liquids from one chamber in the processor card to another during the chemical testing operation.

It has been found, in accordance with the concepts of the invention, that the sample processor card can be provided with a reagent which can then be mixed with, for example, a blood sample by means of centrifugal force. In the preferred embodiment of the invention, the centrifugal force releases the reagent, separates solid particulate matter from the fluid of the blood, measures both the reagent and the blood fluid, mixes them together and, finally, transports them to a chamber from which the product of the chemical testing can be measured, preferably optically, to determine the results of the chemical tests.

DETAILED DESCRIPTION

Figure 1:
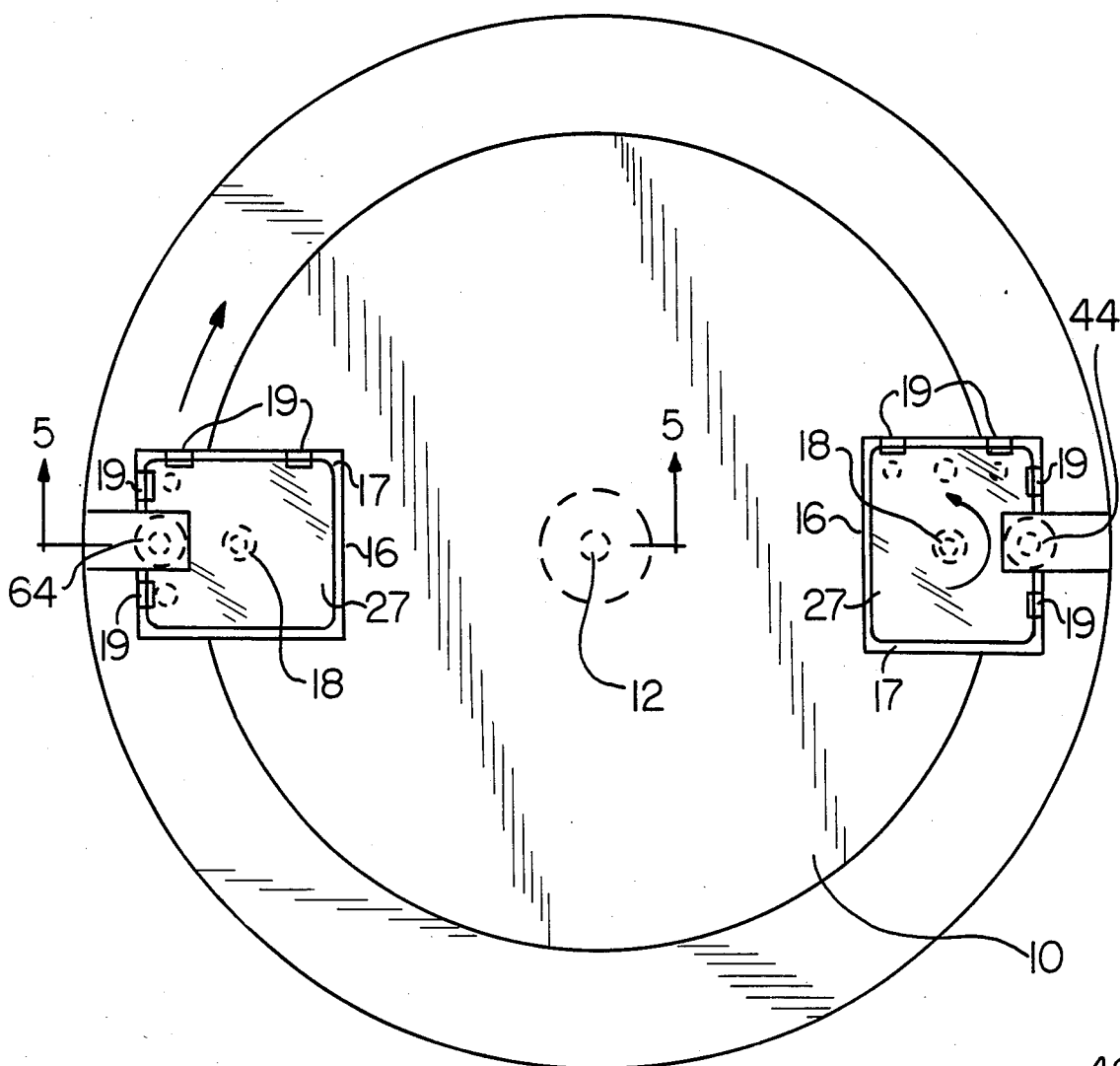
FIG. 1 is a top view in elevation of a schematic diagram of apparatus embodying the concepts of the present invention.

Referring now to the drawings for a more detailed description of the drawings, there is shown in FIGS. 1–4 a schematic illustration of apparatus embodying the concepts of the present invention. The centrifuge includes a plate member 10 which is mounted on an axis 12 for rotation about the axis. The plate member 10 is preferably driven by suitable drive means 14 which may be, for example, an electric motor capable of operating at high speeds. While plate member 10 is shown in FIG. 1 as a circular plate, it will be understood that its configuration as shown is not critical to the practice of the invention. For example, it is equally possible to use a centrifugal arm mounted for rotation about an axis.

Mounted on plate member 10 is at least one sample processor card holder 16 adapted to receive a sample processor card described more fully hereinafter. As is shown in FIGS. 1 and 2, the card holder 16 is in the nature of a tray and is rotatably mounted relative to the plate member 10 on an axis 18 operatively connected to drive means 20 to rotate the holder 16.

Figure 2:
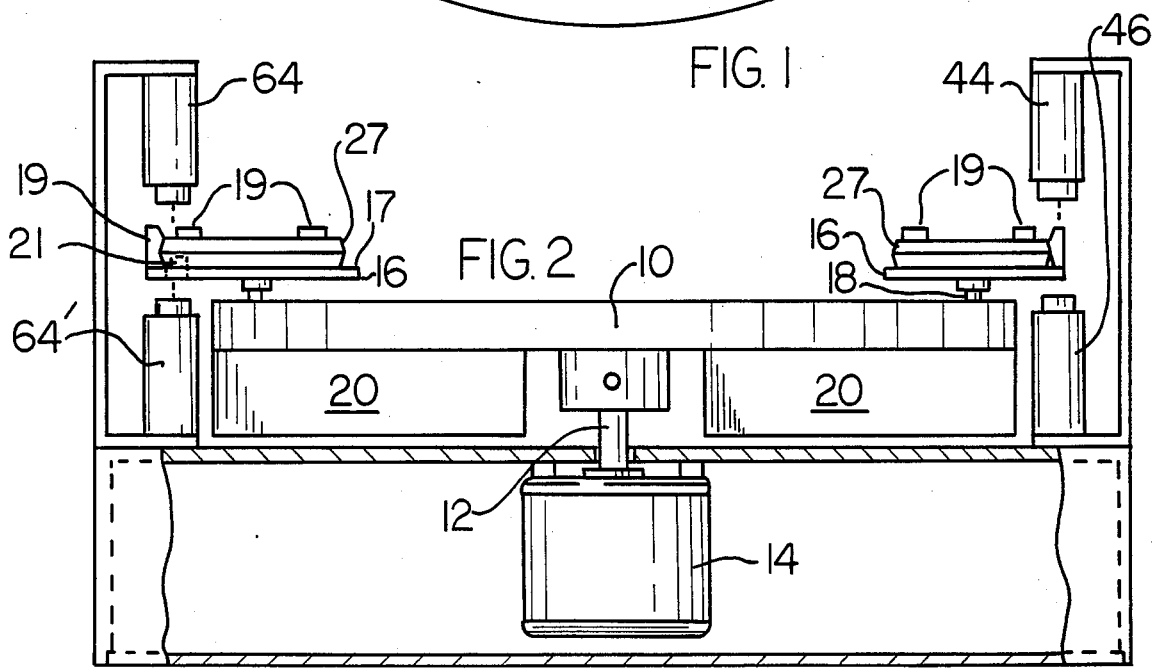
FIG. 2 is a side-elevational view partially broken away of the apparatus shown in FIG. 1.

While the axis of rotation of the plate member 10 is illustrated in FIG. 2 as mounted on a vertical axis, it will be understood by those skilled in the art that the direction of the axis is not critical to the practice of the invention, and the axis, while preferably vertical, can also be horizontal or inclined in any direction since the effects of gravity on the sample processor card rotating with the plate member 10 is negligible.

In the preferred practice of the invention, the holder 16 can be rotated or indexed relative to the plate member 10 by any suitable drive means 20. In the preferred embodiment of the present invention, the holder 16 can be rotated or indexed 90° by the drive means 20. As will be appreciated by those skilled in the art, the holder 16 can be rotatable by an amount greater than 90° up to and including rotatable about a full 360°. The important feature is that the holder 16 adapted to receive the sample processor card be rotatable relative to the plate member 10 so that the direction of the centrifugal force acting on the sample processor card can be altered to effect the necessary fluid transport functions during the chemical testing operation.

Figure 3:
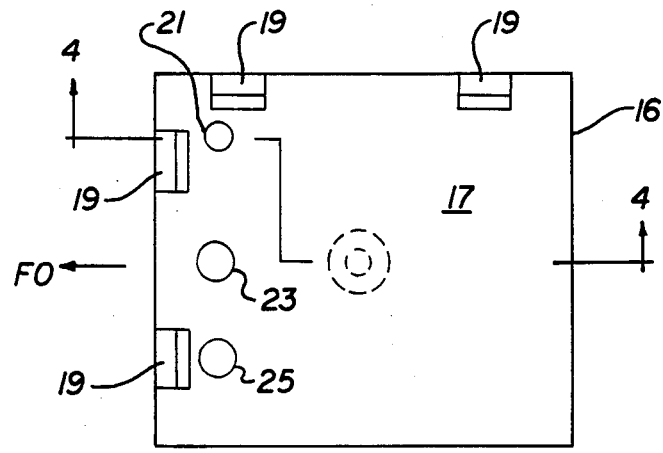
FIG. 3 is a top view of the sample card holder utilized in the apparatus described in FIGS. 1 and 2.

The preferred sample processor card holder is illustrated in FIG. 3 of the drawing and includes a substantially flat plate portion 17 rotatable about the axis 18. The holder is provided with a plurality of finger-like projections 19 positioned at the periphery of the plate portion 17. As will be appreciated by those skilled in the art, use can be made of projections 19 about the entire periphery of the plate member 17. However, it is generally preferred to employ the projections only along those edges in the direction in which the centrifugal force is exerted on the holder 16 and hence a sample processor card mounted on it. Accordingly, FIG. 3 has been shown as illustrating finger-like projections 19 along only two edges of the plate member 17 since those edges are the direction in which the centrifugal force operates in the preferred embodiment of the invention.

As shown in FIG. 3 of the drawing, the holder 16 includes a pin 21 mounted on the plate member 17 so as to position the sample processor card on the holder, as will be described more fully hereinafter. In addition, the plate member 17 includes portions 23 and 25 in the surface thereof which are permeable to light; these portions are preferably openings in the plate 17 to permit the passage of light therethrough, as will also be described more fully hereinafter.

Figure 4:
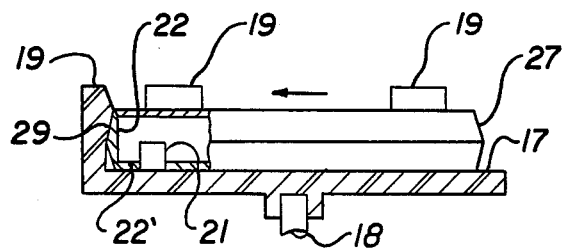
FIG. 4 is a side view in elevation illustrating the securing of the sample card in the receptacle in FIG. 3.

The details of the finger-like projections 19 of the most preferred embodiment of the present invention are shown in FIG. 4 of the drawing, in conjunction with a sample processor card 27. As is there shown, the sample processor card has a double beveled outer edge defined by the surfaces 22 and 22' while the finger-like projection 19 includes a downwardly inclined surface 29 in abutting relationship with the beveled surface 22 of the card 27. In that way, as centrifugal force acts on the card in the direction shown by the arrow in FIG. 4, the inclined surface 29 of the finger-like projection 19 exerts a downward force on the beveled surface 22 of the sample processor card 27. In the preferred embodiment of the invention, it is sometimes preferred that the sample processor card not be in face contact with the plate 17; instead, it is sometimes preferred that a relief be formed under the surface of the sample processor card 27 to permit the flow of air between the bottom of the sample processor card 27 and the plate 17 so that the contents of the card 27 can more quickly reach the desired equilibrium temperature.

Figure 5:
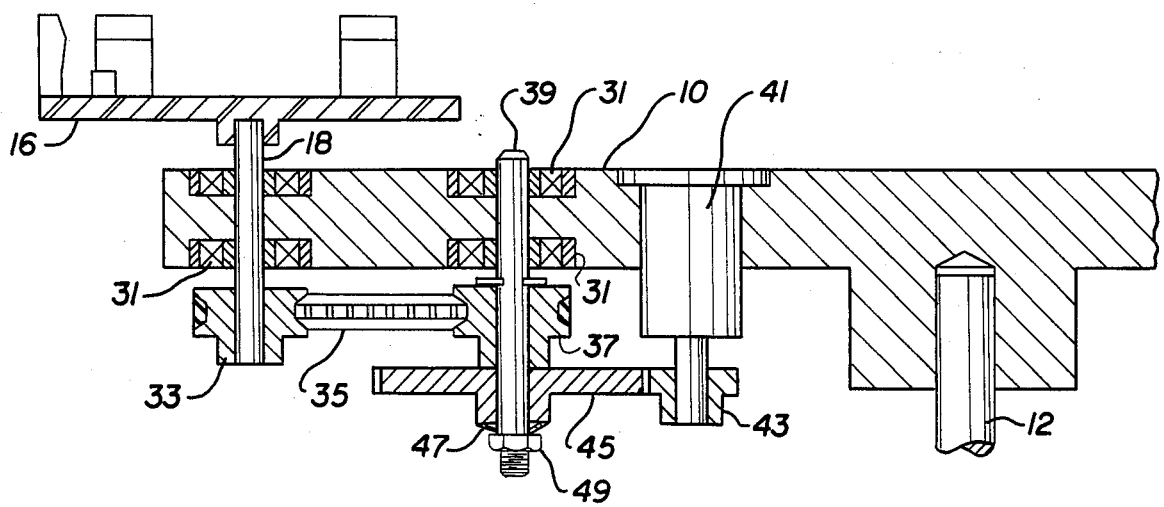
FIG. 5 is a sectional view taken along the lines 5—5 of FIG. 1.

As will be appreciated by those skilled in the art, any of a number of means can be used to rotate the holder 16 relative to the plate member 10. One suitable mechanism for that purpose is shown in detail in FIG. 5 of the drawing for purposes of illustration. Thus, the holder 16 is mounted on a shaft 18 which extends through a corresponding opening in the plate 10. To minimize friction, it is generally desirable that the opening in the plate member 10 be equipped with ball bearings 31. The shaft 18 extends through the plate member 10 and terminates in a pulley 33 on the side of the plate 10 opposite the holder 16. Also mounted through another opening in the plate 10 is a gear motor 41 driving a pinion 43. The pinion 43 operatively engages a gear 45 which forms a portion of a clutch assembly. For that purpose, there is provided a pulley 37 mounted on a shaft 39 extending through an opening in the plate member 10. The pulley 37 drives a belt 35 which in turn drives the pulley 33. The clutch assembly also includes a bellville or spring washer 47 and a nut 49 for adjusting the compression of the spring washer 47.

Thus, the motor 41, through pinion 43, drives the gear 45 which in turn drives the pulley 37 through the frictional engagement between the gear 45 and the pulley 37.

In the embodiment illustrated, it is frequently desirable to include a mechanical stop to control the degree of rotation of the card holder 16. Such mechanical stops are themselves conventional and form no part of the invention. Alternatively, use can also be made of a stepping motor in place of the gear motor 41 to index the card holder 16. When use is made of such a stepping motor, it is unnecessary, as will be appreciated by those skilled in the art, to utilize a clutch mechanism as described in FIG. 5.

A typical sample processor card for use in the practice of the present invention is shown in FIGS. 6 and 7 of the drawings. In their broadest form, the sample processor card includes means to introduce a sample to be analyzed, a supply of reagent and overflow chamber means to receive overflow from the sample inserted into the card. Thus, sample is introduced to the card and moved through chambers defined in the card by centrifugal force so that excess quantities of the sample introduced to the card flow into the overflow chamber. The sample and reagent can then be mixed each with the other by advancing both the reagent and sample through the card by means of centrifugal force. Finally, the reaction product formed by the reagent and sample is moved to a cuvette or measuring chamber so that the necessary measurements on the reaction product can be carried out, usually by optical means.

The sample processor card shown in FIGS. 6 and 7 of the drawing is the preferred sample processor card employed in the practice of the present invention. It is a molded plastic article formed of outer walls 22 and 22' which, along with face plate 24 and bottom plate 26 define a unitary chamber. Within the chamber are a plurality of partitions defining the flow paths of the liquids during the chemical testing operation.

Sample can be introduced to the sample processor card by any of a variety of techniques. In accordance with one embodiment of the invention, the face plate 24 includes an opening 28 therein into which a blood sample, for example, may be deposited in well 8. The blood well 8 serves as a coarse measurement for the blood thus deposited. Also, there can be provided an opening 53 into which a capillary is placed to introduce a blood sample into a capillary slot 34 defined by two interior walls 30 and 32. In either case, blood introduced through the opening 28 or the opening 53 is moved through the capillary slot 34 by means of centrifugal force acting in the direction $F_0$ shown in FIG. 6.

As will be appreciated by those skilled in the art, the techniques involving the use of sample processor card 27 are applicable to any liquid to be subjected to chemical testing. In addition to whole blood, use can also be made of pre-spun blood or other body fluids to be analyzed. Of course, the concepts of the present invention are equally applicable to other liquids which do not originate in the body on which chemical testing is conducted. For ease of description, however, the following describes the use of the sample card 27 using whole blood as the starting sample.

In the preferred practice of the invention, the sample processor card also includes a reagent chamber 86 and a diluent chamber 88 which operate, in response to cenrifugal force acting in the direction $F_0$ as shown in FIG. 6, to release reagent and diluent. The container defining diluent chamber 88 and reagent chamber 86 which is preferably used in the present invention is an injection molded container which is more fully described in copending application Ser. No. 606,785, filed concurrently herewith, the disclosure of which is incorporated herein by reference. The essential feature of such a container is that it releases the diluent and reagent in response to centrifugal force acting upon the card 27.

Thus, in the use of the sample processor card of this invention, a blood sample is added to the card as described above, and then the card is positioned in the holder 16 in the centrifuge, insuring that the pin 21 for alignment of the sample processor card with the holder 16 passes through the corresponding key opening 15 extending through the sample card 27.

The card and the holder are positioned initially so that the blood well and reagent container are closest to the center of rotation of the plate member 10 to insure that the centrifugal force exerted on the sample processor card 27 during the initial rotation of plate member 10 is exerted in the direction $F_0$ as shown in FIG. 6 of the drawing. Thus, after the sample of blood is placed in the blood well and the plate member 10 rotated at high speed to develop centrifugal force, that centrifugal force serves to (a) release the diluent and reagent from their respective chambers 88 and 86, and, at the same, (b) move the blood sample inserted into the blood well 28 down the capillary slot 34 under the effect of the centrifugal force.

Downstream of the capillary slot 34 is a blood holding chamber 36 which is filled with the blood sample deposited into the card. Thus, the blood holding chamber 36 operates as a gross measure, selecting a predetermined quantity of blood sufficient to fill the chamber 50 as described hereinafter. Any blood in excess of the quantity filling chamber 36 passes through an opening 38 defined by a wall of the measuring chamber 36. Thus, the excess blood passes through an excess blood slot 40 to overflow chamber 42 located downstream of the excess blood slot 40. The presence of blood in the overflow chamber 42 can thus be used to confirm to the user that the blood sample deposited in the blood well was of a volume sufficient to completely fill the separating chamber 50.

In the preferred practice of the invention, it is frequently desirable to provide the apparatus with optical means positioned to detect the presence of blood in the overflow chamber 42 to thereby confirm that the sample provided was of a sufficient volume. For that purpose, the apparatus may include a source of light 44 and a detector 46, one or the other being positioned above the rotating plate 10 and the latter being position beneath the holder 16 in alignment with the opening 25 to detect the presence of blood in the overflow chamber 42.

In the preferred embodiment of the invention, the excess blood opening 38 is larger than the restricted opening 48 of the holding chamber 36 to insure that excess blood is rapidly discharged through the excess blood opening 38 and into the overflow chamber 42. Any quantity of blood in excess to the capacity of the overflow chamber 42 can thus spill over into an auxiliary blood overflow chamber 57.

As centrifugal force continues to act on the blood in the holding chamber 36, it is discharged into a blood separating chamber 50 in which blood is subjected to centrifugal force to separate the solid particulate matter from the fluid phase, any excess splling over from the blood separating chamber 50 to the blood overflow chamber 42. As will be appreciated by those skilled in the art, the blood thus introduced to the separating chamber 50 is in effect spun down by the centrifugal force acting in the direction $F_0$ in FIG. 6 to separate the solid matter from the liquid, the solid matter being more dense than the liquid to thereby form a layer of solid matter at the lower portion of the blood separating chamber 50.

As will be appreciated by those skilled in the art, the release of the diluent and reagent from their respective chambers 88 and 86 can occur simultaneously with the movement by centrifugal force of the blood sample down the capillary slot 34. Alternatively, it is possible, and sometimes desirable, to provide a multi-speed operation, a lower speed below a threshold level at which the diluent and reagent are released but one at which the blood is still displaced downwardly through the capillary slot. That technique permits the blood to be separated in the blood separating chamber 50 before the diluent and reagent are released from their respective chambers 88 and 86. Thus, after the blood has been separated in the blood separating chamber 50, the speed of the centrifuge can be increased to effect release of the diluent and reagent.

In either case, the particular configuration of the diluent and reagent chambers 88 and 86 permit the reagent to be released before the diluent as described in the foregoing copending application. The reagent thus passes into the chamber 51, through the restricted opening 52 and into the reagent measuring chamber 54. The diluent, released after the initial release of the reagent, likewise passes into the chamber 51 and into the reagent measuring chamber 54, with any excess spilling over the baffle 56 into the reagent overflow chamber 58.

As will again be appreciated by those skilled in the art, alternatives with respect to the use of the reagent can be employed. For example, a solid reagent can be employed and positioned as a pellet in reagent measuring chamber 54 which is activated on release of the diluent as the diluent flows into the reagent measuring chamber 54. Other physical forms of reagent may likewise be used, such as a reagent gel, which would likewise be positioned in the reagent measuring chamber 54.

Alternatively, the solid reagent could be present as a coating on the walls of the reagent measuring chamber 54 which is dissolved when the diluent is released and passed into the reagent measuring chamber 54 as described above. Such a coating of reagent can also be applied to other areas of the card, notably the mixing chamber 60 and/or the cuvette chamber 62, both of which are described more fully hereinafter.

It is an important concept of the most preferred embodiment of the invention that the reagent measuring chamber 54 measures a precise, predetermined amount of reagent and diluent.

Once the reagent (mixed with diluent) has been measured in the reagent measuring chamber 54 and the blood separated in the blood separating chamber 50, the card is rotated 90° as the centrifuge plate member 10 rotates about its axis, so that the centrifugal force is now acting in the direction $F_1$ as shown in FIG. 6. After rotation of the card, the centrifugal force thus displaces the measured quantity of reagent (mixed with diluent) from the reagent measuring chamber 54 to a mixing chamber 60. At the same time, the liquid constituent of the blood sample or a portion thereof is transferred to a sample holding chamber 61 downstream of the separating chamber 50. (Downstream as used in that sense is downstream in the direction of the centrifugal force when it is acting in the direction $F_1$ as shown in FIG. 6.)

As the plate member continues to rotate, the sample card is then again rotated back to the original position where the centrifugal force is acting in the direction $F_0$ as shown in FIG. 6. In that position, the centrifugal force causes the sample in the sample holding chamber 61 to be conveyed to the sample measuring chamber 63, with any excess sample overflowing sample measuring chamber 63 to a sample overflow chamber 65.

Simultaneously, on rotation of the card to the position where the centrifugal force is acting in the direction $F_0$ as shown in FIG. 6, the reagent (mixed with diluent) in the mixing chamber 60 is displaced in a downstream direction. Positioned in the mixing chamber 60 are a series of baffles 67, 69, 71 and 73 which, along with the lateral wall 83 of the mixing chamber 60, define a series of restricted openings 75, 77, 79 and 81. The purpose of those restricted openings is to generate turbulence in the reagent (mixed with diluent) as it flows from the upper portion of the mixing chamber 60 toward the cuvette chamber 62, more fully described hereinafter. As the reagent (mixed with diluent) passes through those series of openings, the resulting turbulence insures that complete mixing of the diluent with the reagent will be achieved.

Thus the reagent is moved under the effect of the centrifugal force through the restricted openings 75, 77, 79 and 81 into the cuvettte chamber 62. Since the reagent, at this stage of the operation, is unmixed with the sample, the sample remaining in the sample measuring chamber 63, the operator is permitted to take an optical reading of the reagent itself, prior to the time that it is mixed with the sample.

For the purpose of determining the optical characteristics of the reagent mixed with the diluent before contact with the sample, use can be made of a light source 64 and a light detector 64', one being positioned above the card holder 16 and the other beneath it, again with an opening in the card holder 16 to permit the transmission of light from the source 64 to the detector 64' through the cuvette chamber 62. That is sometimes a desirable operation, particularly when the measurements being taken on the sample are to be optical characteristics such as absorbance. The reading taken on the reagent before contact with the diluent enables one to correct the final readings for any absorbance contributed by the raw reagent. That technique can also be used to enable the operator to determine that the reagent was of high quality, and had not been degraded through the passage of time or by contact with an adverse environment.

After the operator has had an opportunity to monitor the characteristics of the reagent in the cuvette chamber 62, the sample processor card is again rotated 90° so that the centrifugal force is again acting in the direction $F_1$ as shown in FIG. 6 of the drawing. The centrifugal force thus causes the sample, in the sample measuring chamber 63, to pass through a chamber 85 and into the mixing chamber 60 where the sample, along with the reagent from the cuvette chamber 62, pass together through the series of restricted openings 81, 79, 77 and 75 into the upper portion of the mixing chamber 60 to effect mixing of the sample with the reagent. Because of the configuration of the baffle separating the sample measuring chamber 63 from the sample overflow chamber 65, any sample in the overflow chamber 65 is retained therein.

After the sample and reagent reach the upper portion of the mixing chamber 60, the card is again rotated 90° while the plate member rotates, so that the centrifugal force is once again acting in the direction $F_0$. That rotation of the card causes the sample and reagent in the upper portion of the mixing chamber 60 to again pass through the restricted openings 75, 77, 79 and 81. In other words, mixing of the sample with the reagent occurs by means of two passes through the restricted openings 75 to 81 as described. The mixture of the sample and reagent is thus displaced under the centrifugal force acting in the direction $F_0$ into the cuvette chamber 62. At this stage in the procedure, optical readings of the reaction product of the sample and reagent can be taken incrementally or the final stage by means of the light source 64 and detector 64' in the manner described above.

Alternatively, continuous mixing can be achieved by again rotating the card so that the reagent and sample mixture is again displaced through the restricted openings while the chemical reaction between the two is ongoing during the incubation period of the reaction.

It is an important concept of the present inventon that the centrifugal force operating on the fluids in the sample processor card be at a relatively high level so that the centrifugal force greatly overwhelms the fluid surface tension. That insures that the meniscus of the fluids defines a section of a substantially circular cylinder about the center of the centrifuge plate. When the sample processor card is rotated, the fluids pour from one chamber to another in the same way as if the chamber size and fluid quantities were much larger. If the rotation were such that substantially lower centrifugal forces were created, the fluids would tend to pour in large droplets and give quite variable results. It has accordingly been found that best results are usually achieved when the plate member is rotated at speeds sufficient to create centrifugal forces of at least 500 g's.

It will be understood that various changes and modifications can be made in the details of construction, procedure and use without departing from the spirit of the invention, especially as defined in the following claims.

We claim:

1. Apparatus for carrying out analysis of a sample under centrifugal force, comprising:
   (a) a plate member adapted for rotation about an axis,
   (b) at least one holding means mounted on said plate member for rotation therewith and means for rotating said holding means relative to the plate member as the plate member rotates about said axis,
   (c) a sample processor card mounted on said holding means and having means for containing a reagent, at least two chambers and a series of channels through which the sample and/or reagent can be moved under the influence of centrifugal force generated by said plate member, and
   (d) means for mixing the sample and reagent while said plate member is rotating by changing the effective direction of centrifugal force acting on said processor card to transfer the reagent and sample from one of said at least two chambers to the other of said at least two chambers.

2. The apparatus as recited in claim 1 which includes means for rotating the plate member about said axis.

3. The apparatus as recited in claim 1 wherein the means for rotating the holding means includes a rotatable shaft fixed to and carrying the holding means, and drive means to rotate said shaft to turn the holding means.

4. The apparatus as recited in claim 1 which includes key means on the holding means to permit registry of the sample processor card on the holding means.

5. The apparatus as recited in claim 1 which includes means on the holding means to secure the sample processor card thereto.

6. The apparatus as recited in claim 5 wherein the means to secure the sample processor card includes a plurality of finger projections extending from the holding means adapted to engage the sample processor card.

7. A method for performing analysis of a sample under centrifugal force caused by rotation of a plate member about an axis, said method comprising the steps of:
   (a) centrifuging a sample processor card containing a sample, at least one reagent, a plurality of chambers and channels through which liquid can be moved by centrifugal force to cause separate volumetric measurements of the sample and reagent;
   (b) rotating the sample processor card with respect to the plate member while the plate member is rotating to mix the measured reagent and sample together to form a reaction product; and
   (c) measuring a parameter of the reaction product of the reagent and sample.

8. The method according to claim 7 wherein, prior to said volumetric measurement, said centrifuging causes release of the reagent from a reagent continer.

9. The method according to claim 7 wherein prior to said volumetric measurements, said centrifuging causes separation of the sample into at least two components.

10. The method according to claim 7 and comprising, prior to said rotating to mix the reagent and the sample, additionally rotating the card to transfer the reagent to a chamber where a reagent blank measurement can be made.

11. The method according to claim 7 wherein said rotating to mix step is repeated to enhance mixing of the reagent and the sample.

12. The method according to claim 7 wherein said measuring a parameter comprises taking optical absorbance measurements and comparing them to the reagent blank.

* * * * *